United States Patent [19]

Pipon et al.

[11] Patent Number: 5,064,246
[45] Date of Patent: Nov. 12, 1991

[54] POSITIONING AND BLOCKAGE DEVICE OF A SEAT BACK ARMATURE ON A SEAT BASE ARMATURE MOUNTED AUTOMATICALLY IN A VEHICLE

[75] Inventors: Yves Pipon; Georges Droulon, both of Saint Georges des Groseillers, France

[73] Assignee: A. & M. Cousin-Establissments Cousin Freres, Orne, France

[21] Appl. No.: 433,935

[22] Filed: Nov. 9, 1989

[30] Foreign Application Priority Data

Nov. 10, 1988 [FR] France ............................. 88 14698
Sep. 26, 1989 [FR] France ............................. 89 12596

[51] Int. Cl.⁵ .................................................. A47C 7/00
[52] U.S. Cl. ...................................... 297/443; 297/440
[58] Field of Search ........................ 297/443, 440, 452

[56] References Cited

U.S. PATENT DOCUMENTS

| 3,989,298 | 11/1976 | Cycowicz et al. | 297/443 X |
| 4,362,311 | 12/1982 | Bergman | 297/440 X |
| 4,890,888 | 1/1990 | Kostin | 297/443 |

Primary Examiner—Laurie K. Cranmer
Attorney, Agent, or Firm—Browdy and Neimark

[57] ABSTRACT

Each fixation member is mounted on a mechanism for setting inclination of the seat back and is formed of a casing so shaped to receive a dagger fixed to each lower end of the seat back armature. The dagger is held within the casing by being wedged with assistance of a part made of a central serrated roller and two lateral smooth extensions of smaller diameters enabling the roller to rotate freely inside openings formed in the casing and to be pushed by at least one spring for wedging the roller between the dagger and said casing.

12 Claims, 8 Drawing Sheets

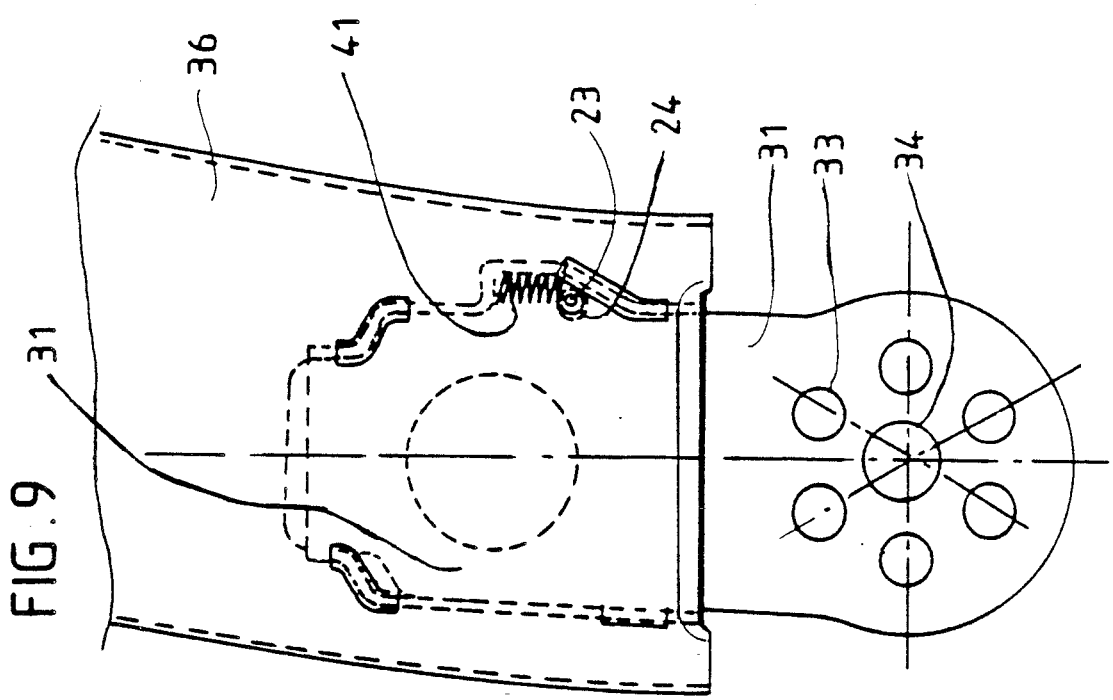
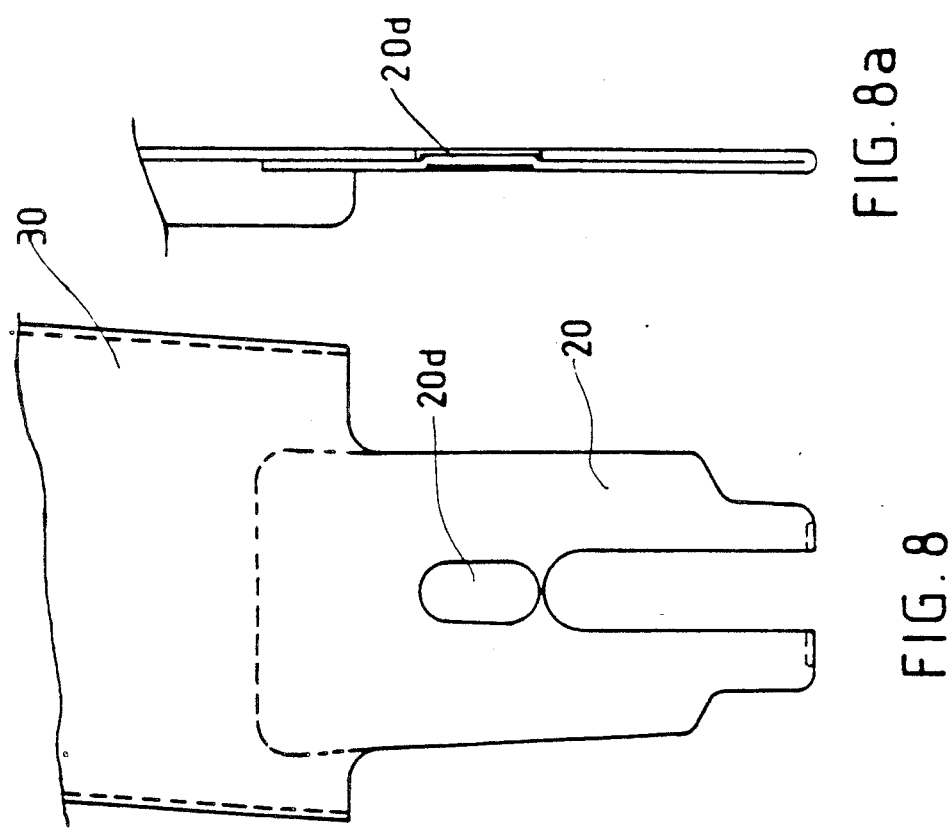

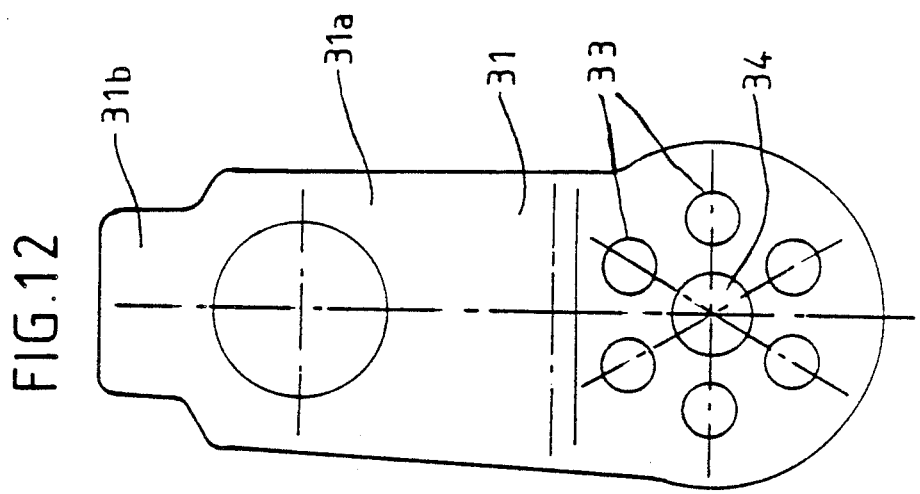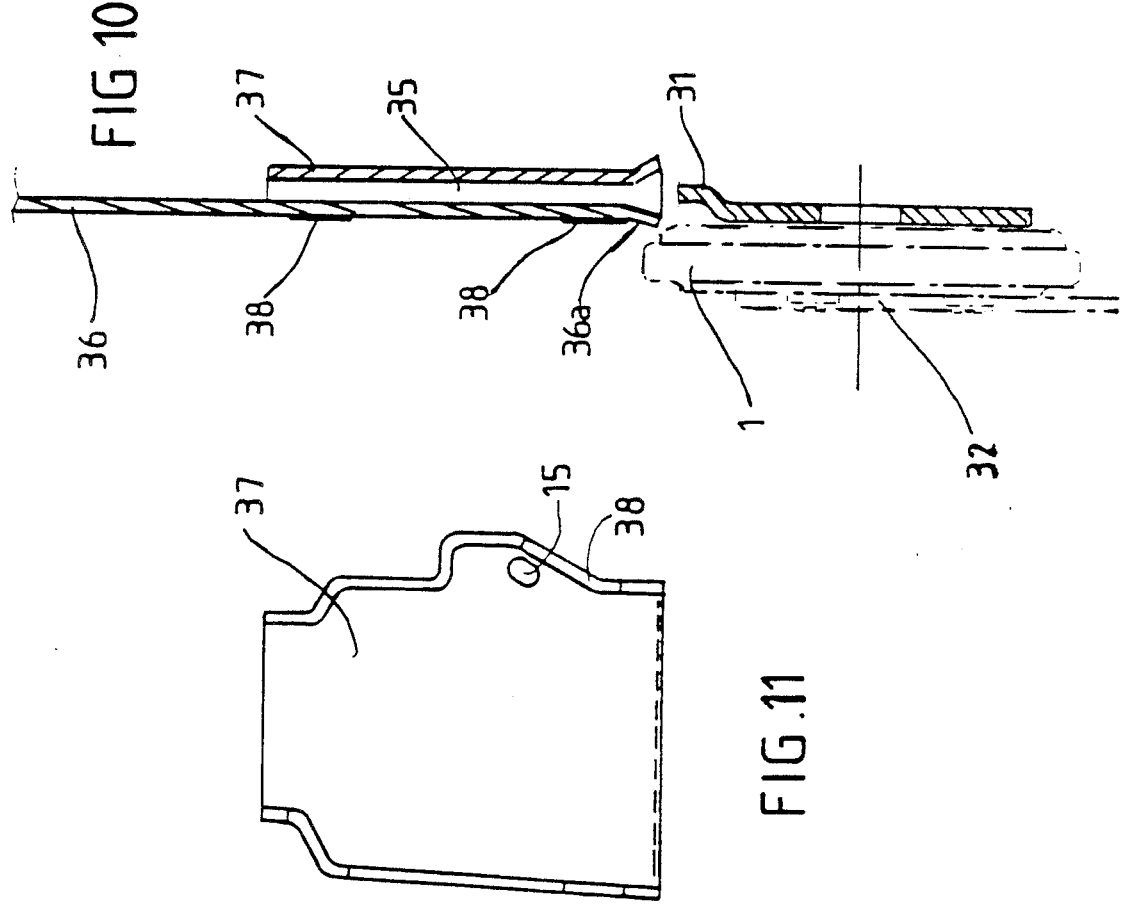

POSITIONING AND BLOCKAGE DEVICE OF A SEAT BACK ARMATURE ON A SEAT BASE ARMATURE MOUNTED AUTOMATICALLY IN A VEHICLE

FIELD AND BACKGROUND OF THE INVENTION

In current practice, the seat of vehicles, and in particular the seats of automobile vehicles, are composed of a seat base armature and of a seat back armature which are rigidly connected together by various means such as by welding, rivetting or others In some cases, it is possible to mount, between the seat base armature and the seat back armature, mechanisms for positioning in a variable manner the seat back with respect to the seat base.

A lining of the seat is effected thereafter

When the two armatures are connected together, the assembly is very cumbersome and heavy and, therefore, the mounting in the vehicle passenger space is always difficult and requires most often the use of two operators.

Efforts have been made to automatize the mounting of the seats but, due to the space requirement and to the weight of each of the seats, it is necessary to use complex means in order to get round the difficulties for introducing the seats inside the passenger space, above all when they are equipped with a headrest.

The present invention remedies this disadvantage by starting from the concept that it is normal to separate the seat back armature from the seat base armature which will be mounted alone and automatically on the vehicle floor in a first mounting station of an assembly line. Then in a second mounting station of this assembly line, it is possible to position automatically the seat back armature on the seat base armature, either manually or automatically. It is also possible to provide the fixation of the seat back armature onto the seat base armature in a manual way and without any tool by using prepositioned abutments.

SUMMARY OF THE INVENTION

According to the invention, the positioning and blockage device of a seat back armature on a seat base armature mounted in a vehicle in which rear ends of the seat base armature include fixation members, is characterized in that each of the fixation members is mounted on an inclination setting mechanism for setting inclination of the seat back armature and is formed of a casing so shaped to receive a dagger fixed to each lower end of the seat back armature, this dagger being held within the casing by being wedged with assistance of a part made of a central serrated roller and two lateral smooth extensions of smaller diameters enabling the roller to rotate freely inside openings formed in the casing and to be pushed by at leat one spring for wedging the roller between the dagger and the casing.

Various other features of the invention will become more apparent from the following detailed description.

BRIEF DESCRIPTION OF THE DRAWINGS

Embodiments of the invention are shown by way of non limiting examples in the accompanying drawings, in which:

FIG. 8 is a front elevation view of an alternative embodiment of FIG. 7 showing the end of the seat back armature of a seat;

FIG. 8a is a longitudinal cross-sectional view corresponding to FIG. 8;

FIG. 9 is a lateral elevation view showing another alternative embodiment of the invention;

FIG. 10 is a partial elevation and cross-sectional view of the mounting of the seat back armature on the seat base armature of a seat by using the embodiment of FIG. 9, but with incorporation of a mechanism for setting the inclination of the seat back with respect to the seat base;

FIG. 11 is a front view of one of the elements of FIGS. 9 and 10;

FIG. 12 is a front view of the other element of FIG. 10, and which is rigidly connected to the seat base armature;

DETAILED DESCRIPTION OF THE INVENTION

Figure 1:
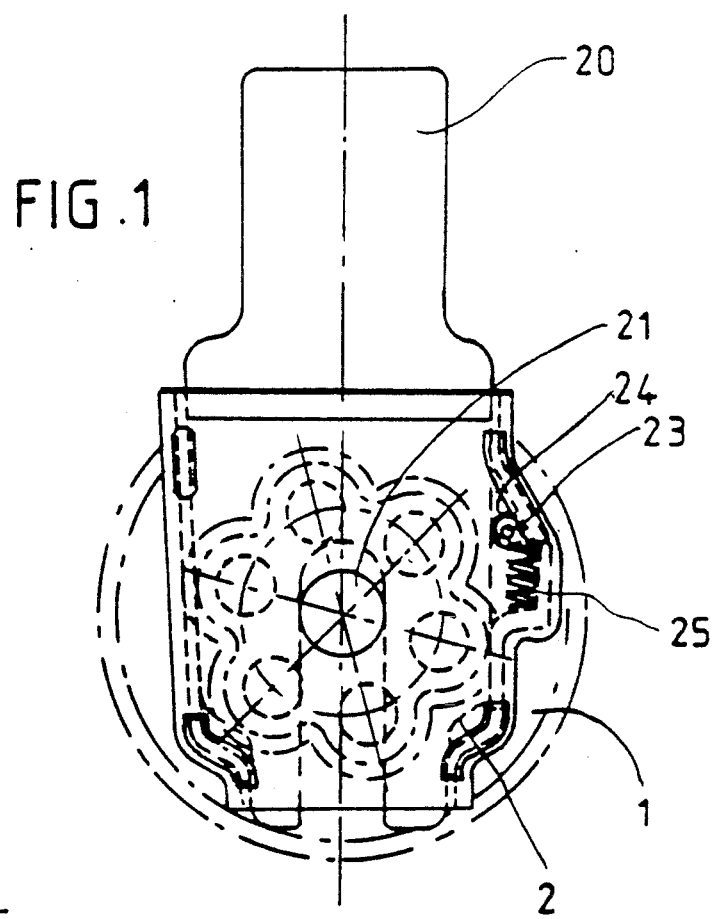
FIG. 1 is a side elevation and partly schematic view of the junction zone of a seat back armature on a seat base armature.

Referring now to the drawings, FIG. 1 shows schematically the mounting of one of the sides of a seat back armature on a seat base armature.

Actually, and as it may be readily understood, an articulation setting mechanism 1 for setting the inclination of a seat back with respect to the seat base, which is fixed on one side of the seat base armature via its fixed side, carries on its mobile side a junction element in the shape of a casing 2 (see FIGS. 2, 2a, 3, 3a) made of two half-casings 3, 4 connected together by any convenient means, such as by welding or crimping.

For example and as shown, the half-casing 4 can be connected to the half-casing 3 by introduction of lugs 5 inside openings 6 of the half-casing 3. The casing 2 is then formed by an assembly of the two half-casings 3, 4, expansion of the lugs 5 forming thus a rivetting junction, or the junction can be provided by welding the lugs 5.

Figures 4, 5, 6:
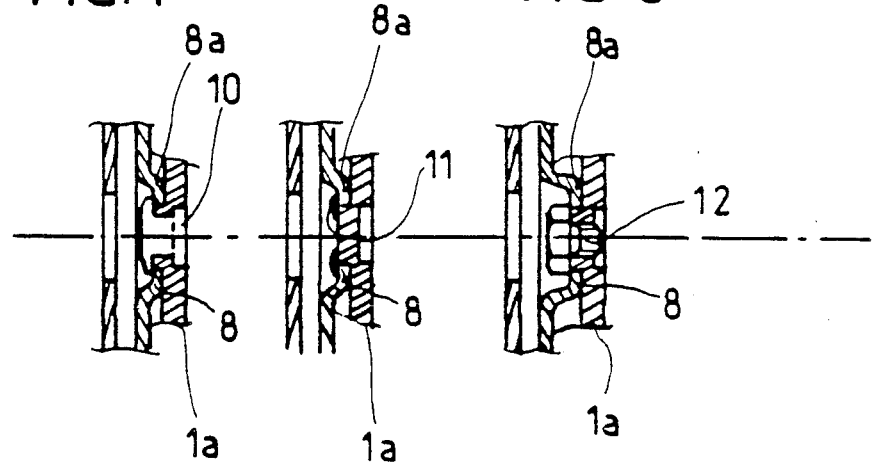
FIGS. 4, 5 and 6 show fixation means for the junction elements forming a casing on the seat back armature of a seat.

The half-casing 3 is formed with circular openings 7 adapted for a passage of tools which subsequently cooperate with holes 8 obtained by a cut-out step in a cup-shaped formation 8a (see FIGS. 4, 5 and 6); so as to provide for the junction of the whole casing 2 on the mobile side 1a of the mechanism 1, this junction being made either by rivets 10 (FIG. 4), welds 11 (FIG. 5), or cap-screws 12 (FIG. 6).

It thus results that the casing 2 is rigidly connected to the mobile portion of the mechanism 1, and this operation can be easily carried out with assistance of an automatic machine.

Figure 2:
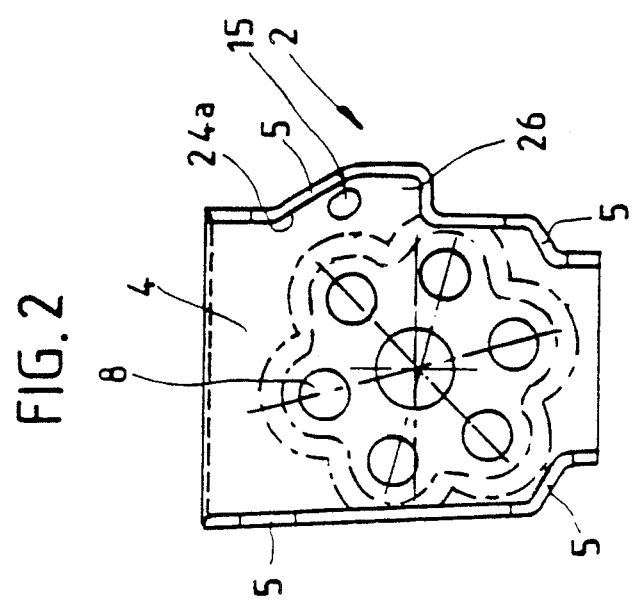
FIG. 2 is a front elevation view of one of the two halves of the junction element, and which is rigidly connected to a half-casing.
Figure 2A:
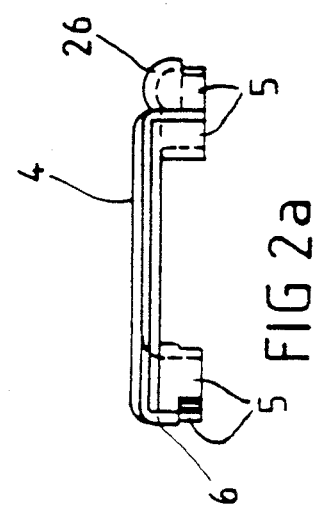
FIG. 2a is a top view corresponding to FIG. 2.
Figure 3:
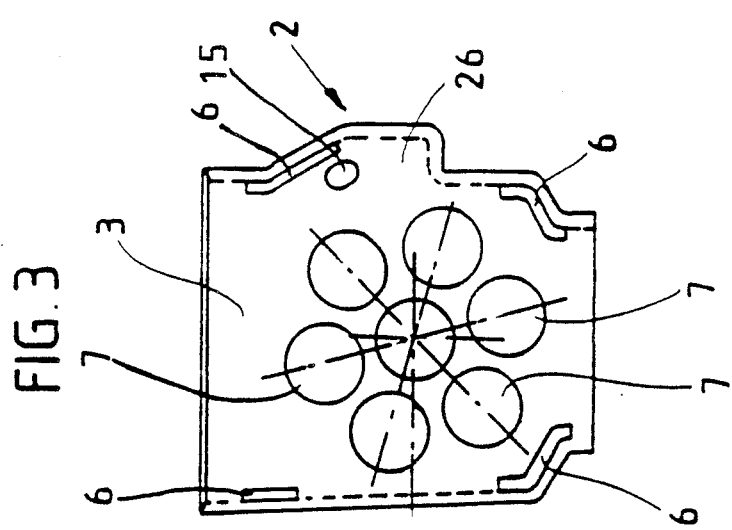
FIG. 3 is a front elevation view of the other one of the two halves of the junction element, and which is fixed on the seat base armature.
Figure 3A:
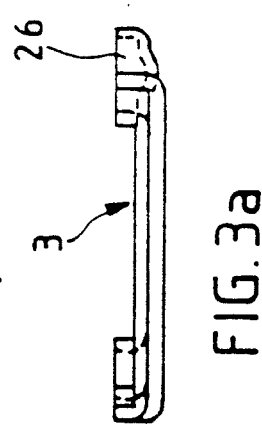
FIG. 3a is a top view corresponding to FIG. 3.

One should note the presence in FIGS. 2 and 3 of an oblong double hole 15, the function of which will be explained later.

When this assembly is mounted on the armature of the seat base of the seat on either side of this armature, one can easily introduce the whole inside the passenger space of a vehicle and fix this assembly on the floor of the vehicle.

Figure 7:
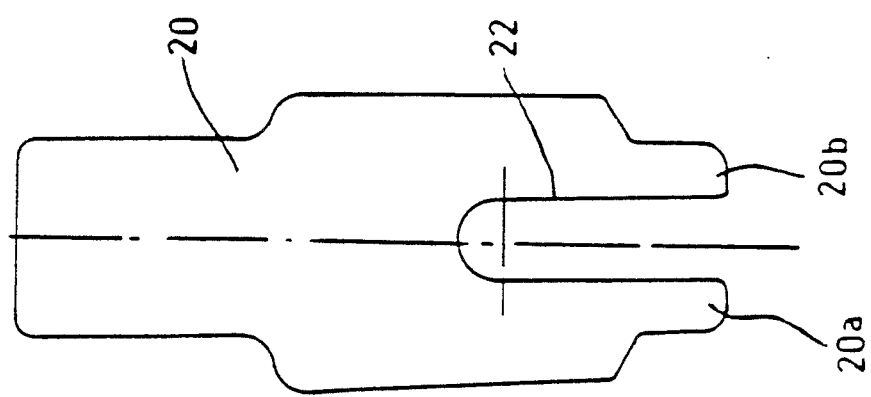
FIG. 7 is a front view of the part rigidly connected to one of the ends of the seat back armature adapted for cooperating with the junction element forming the casing of FIGS. 2 and 3.

When the corresponding working station has effected such a fixation of the seat base inside the vehicle and, if necessary, on the right hand side and left hand side of the vehicle, by machines placed on both sides of the assembly line, one proceeds to the next station in which, after having fixed a part 20 (FIG. 7), which will be called hereafter dagger, on each of the two lower ends of the seat back armature, these two daggers 20 are simultaneously introduced inside the casing 2 placed on either side of the seat base armature in question which is thus rigidly connected to the floor of the vehicle in consideration.

There is thus obtained the mounting shown in FIG. 1 in which it can be found that:

a) the rotation shaft 21 of the mechanism 1 which is provided for rotating the seat back armature with respect to the seat base armature, is fixed to seat back armature and can extend through the dagger 20 since this dagger is formed in its lower portion with an elongated opening 22;

b) the lower ends 20a, 20b of the dagger 20 are thinned out in order to be wedged inside the lower portion of the casing 2; and c) there is provided, extending through the oblong holes 15, a pin 23 on which is mounted a roller 24 having a serrated peripheral surface and which is freely mounted inside the oblong holes 15.

Figure 1A:
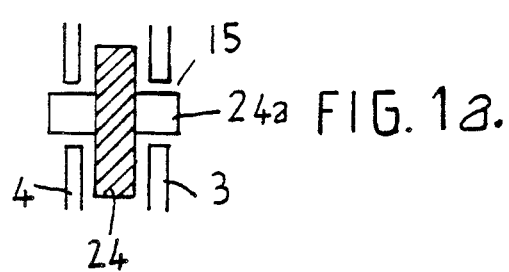
FIG. 1a is a partially broken away side view of a detail of the device of FIG. 1.

As shown in FIG. 1a the roller 24 is mounted on pin 23. FIG. 1a further shows that pin 23 is constituted of two smooth extensions 24a on either side of roller 24 having diameters smaller than roller 24. This permits roller 24 to freely rotate in oblong hole 15 in the half casing 3, 4. When the dagger 20 is being inserted within the casing 2, it pushes the serrated roller 24 backwardly in the oblong holes 15. Then, by bearing on the inner side of each half casing 3, 4 in an area 24 in which it is urged by a spring 25 housed in a recess 26 of each half casing 2, 3, the serrated roller 24 will have a tendency to be upwardly pushed to bias and wedge the dagger in the casing 2.

This wedging of the dagger 20 within the casing 2 prevents the seat back to be submitted to front and rear backlashes with respect to the seat base.

There is thus obtained a permanent and reliable blockage of the daggers 20 within the casing 2. Therefore the armature of each seat back is permanently and reliably blocked on the armature of the seat base of the seat in consideration by means of two inclination setting mechanisms 1 placed on either side of the seat back.

Because of the rotation shaft 21 which is mounted either on the mechanism 1 on the right of the seat or on the mechanism 1 on the left of the seat, a control of these mechanisms 1 can be provided either on the right or on the left of the seat, and this in a standard manner.

The hereabove description shows therefore that it is possible, by simple means, to automatically mount the armature of a backing portion of a seat on the seating portion of this seat in two working stations of an assembly line without human intervention.

In FIG. 8, the dagger 20 which is provided at the ends of the seat back armature 30 of the backing portion of a seat is made by two thicknesses formed by press cutting and bending of a metal sheet, these two thicknesses being connected together by a central dished-out portion 20d.

It is thus possible to use very thin metal sheets which are easily worked with a press.

In FIGS. 9, 10, 11 and 12, the dagger then designated by reference numeral 31 is rigidly connected to the seat base armature 32 of the seating portion of the seat via an inclination setting mechanism 1 by fixing the dagger 31 on the mobile portion of the mechanism 1 with assistance of holes 33 conveniently distributed along a circle concentric to a hole 34 enabling a passage of the control shaft of the mechanism 1 such as the rotation shaft 21 of FIGS. 1-7.

As may been in FIG. 12, the dagger 31 has an upper portion 31a which is slightly restricted, then finally a head 31b narrower and adapted for easily penetrating into a casing 35 rigidly connected to one of the ends of a seat back armature 36 of the backing portion of the seat. The casing 35 which is used in lieu of the casing 2 of FIGS. 1-7 is made on one side by the armature 36 which is slightly flaring out at 36a in order to facilitate introduction of each dagger, and by a lid 37 (FIG. 11) which includes lugs 38 rivetted on the metal sheet forming the seat back armature 36.

As in the previous case, there is provided a pair of oblong holes 15, the function of which has been previously explained.

The mounting operation is identical to that of the previous case since, when the daggers 31 are fixed on the mobile portions of the mechanisms 1 made rigid with the seat base armatures 32, the work being effected as the seat is being manufactured, the second mounting station presents the complete seat back armature 36 with the casings 35 which come in engagement, on either side of the seat back armature, on the daggers 31.

In FIG. 9, there is also provided a pin 23 on which is mounted a serrated roller 2.

In that case, the effect of introducing the daggers 31 into the casings 35 is to block the daggers 31 inside the casings 35 by wedging the rollers 24 as already described for the embodiment of FIGS. 1-7.

Reference numeral 41 designates a small spring biasing back the pins 23 and therefore the roller 24 downwardly since, in the present case, blocking is made from top to bottom and not from bottom to top as in the embodiment of FIGS. 1-7.

It should be noted that in both cases, it is easy to disassemble the seat backs by using a tool for pressing the springs 25 (FIG. 1) or 41 (FIG. 9) so as to disengage the corresponding rollers 24 and therefore to free the daggers 20 or 31 with respect to the casings 2 or 35. This result is obtained by exerting a pressure on a part of the pins 23 extending outside the corresponding casing.

Figure 15:
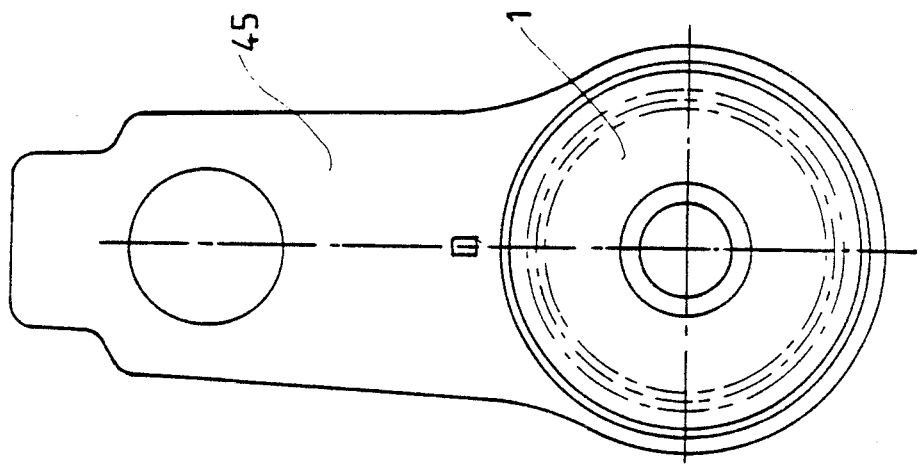
FIGS. 13, 14 and 15 show another alternative embodiment which is very similar to that of FIGS. 9, 10, 11 and 12.
Figure 13:
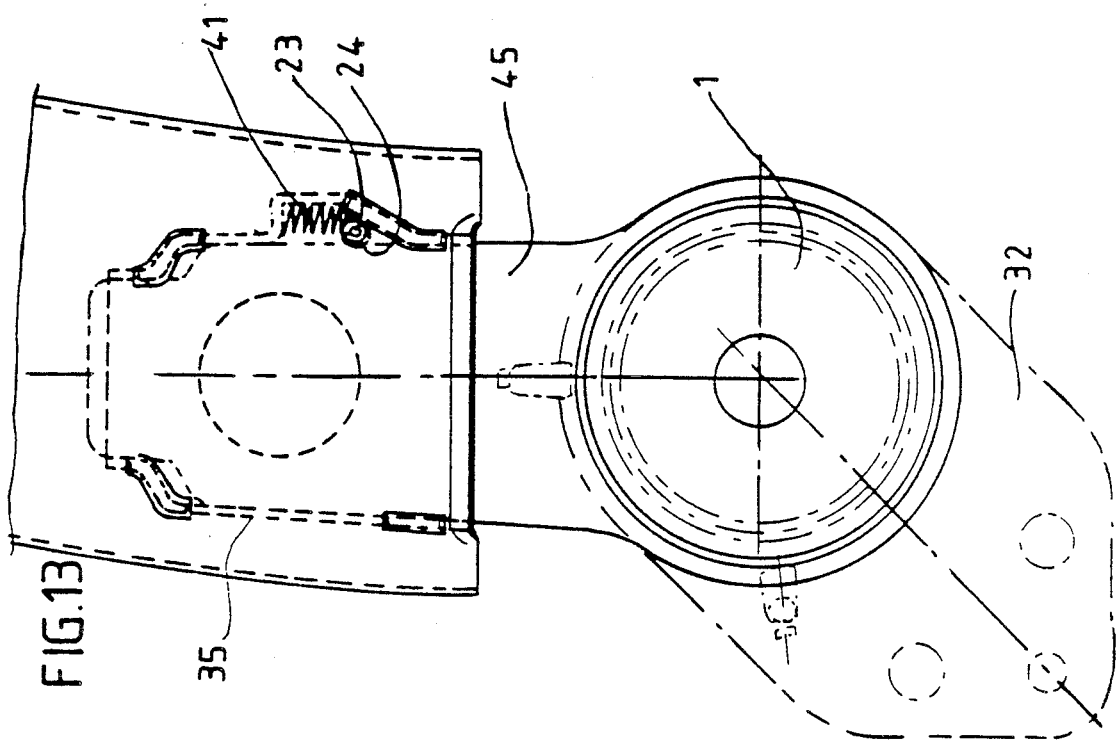
Figure 14:
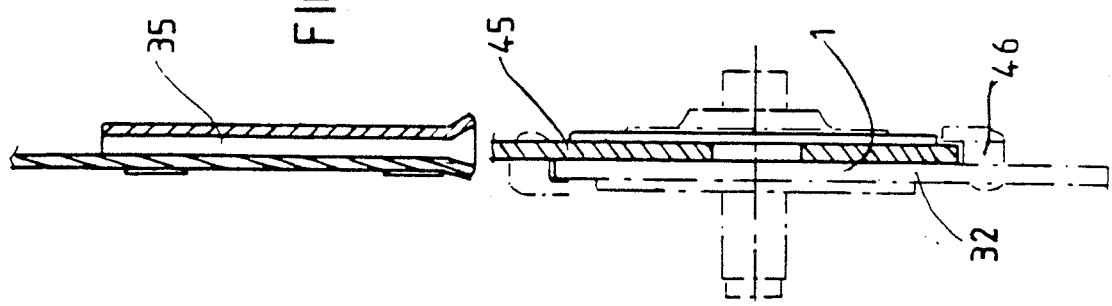

FIGS. 13, 14 and 15 show a dagger 45 integrally connected to the mobile member of the articulation mechanisms 1 so as to limit the number of parts. The mounting of such a dagger in the casings 35 is identical to that described with reference to FIGS. 9 to 12, the reference numerals used being the same.

It should only be pointed out that the daggers 45 are held on the fixed portion 32 of the positioning mechanism 1 which is rigidly connected to the seating portion of a seat by studs 46 currently used in such a case.

Figure 18:
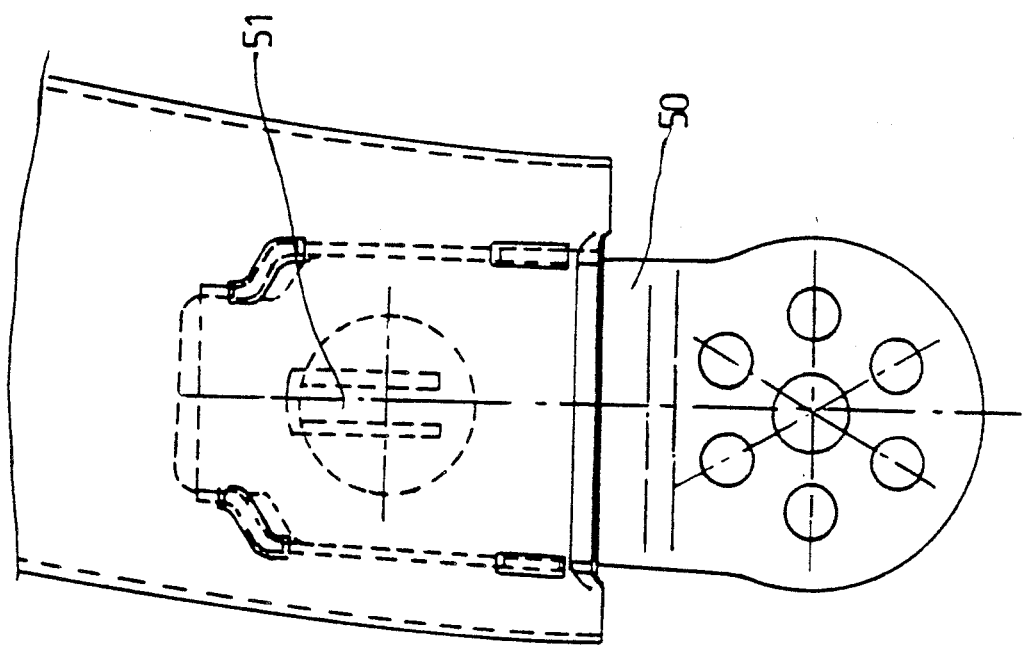
FIGS. 16, 17 and 18 show still another embodiment including slight manufacturing variants and which is very similar to the embodiment of FIGS. 9 to 12.
Figure 16:
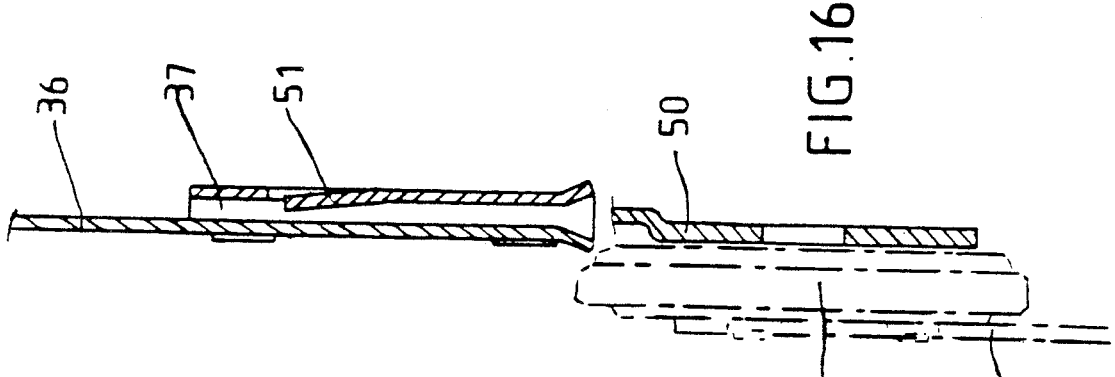
Figure 17:
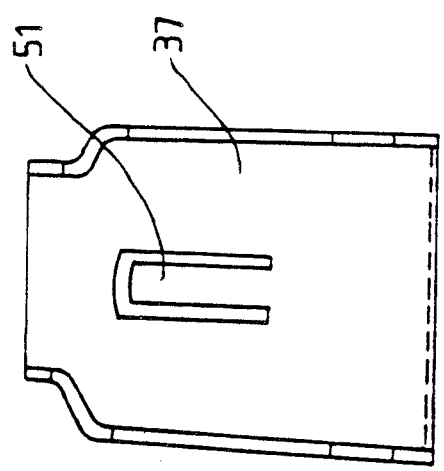

Finally, FIGS. 16 to 18 show a blocking of daggers 50 (their mounting being identical to that of FIGS. 9 to 12) by a blade 51 conveniently cut out from the side face of the lid 37. In that case, pin 23, the then roller 24 and spring 25 or 41 is omitted since the latching mechanism is effected by the blade 51.

When reference was made to mechanisms enabling a setting of the inclination of the seat back with respect to the seat base or seating portion, it was understood that these mechanisms could be of any kind, that is continuous mechanisms with epicycloidal gear trains, discontinuous mechanisms with grains or even different mechanisms operating by electromagnetic wedging or others.

As it appears from the above description and whatever the cases envisaged in FIGS. 1 to 18, it is therefore possible to easily separate the backing portion of a seat from the seating portion of the seat in consideration by simple means, which is an unwedging of the rollers 24 or a temporary deformation of the blade 51.

In some cases and for a complete safety and perfect blockage of the two elements one with respect to the other, that is the backing portion on the armature, one is led to modify the connection devices for the assembly positioning and automatic blockage, and this will be described hereinbelow.

Figure 19:
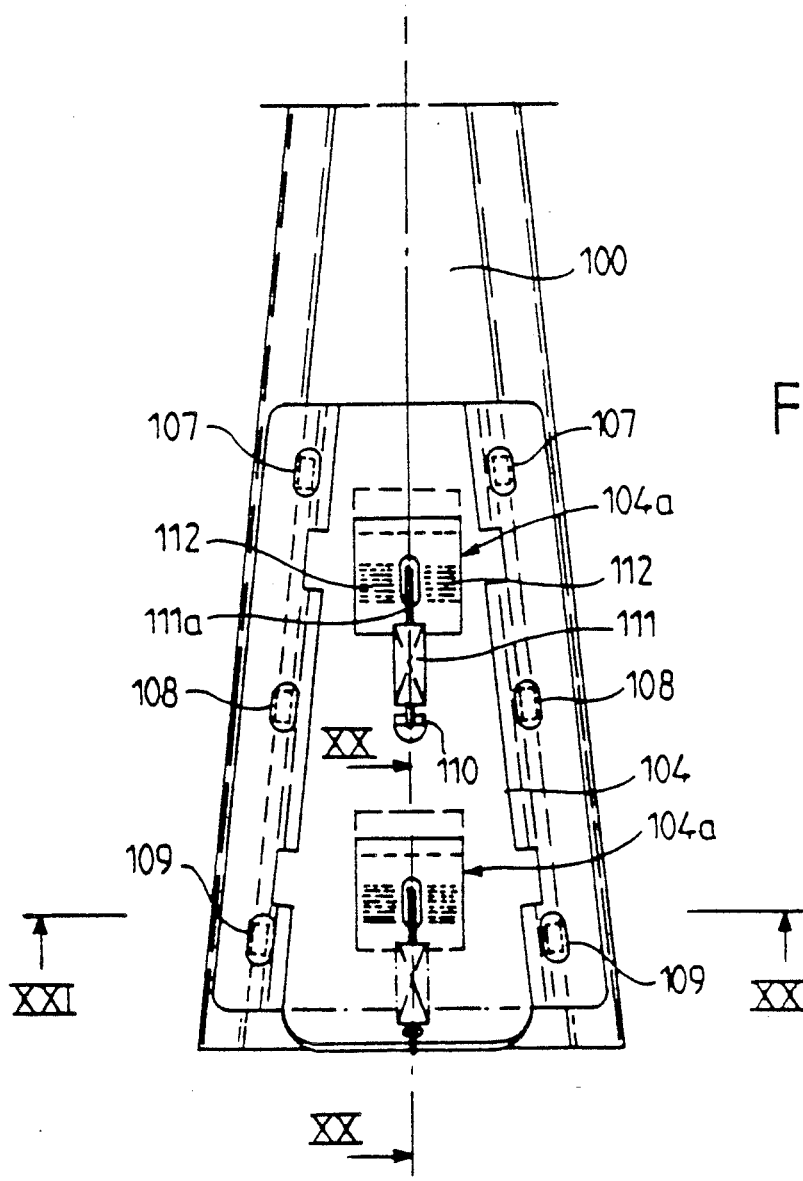
FIG. 19 is a front view of the junction zone of the seat back armature on the seat base armature, only one side of the seat having been shown in order to facilitate understanding.
Figure 21:
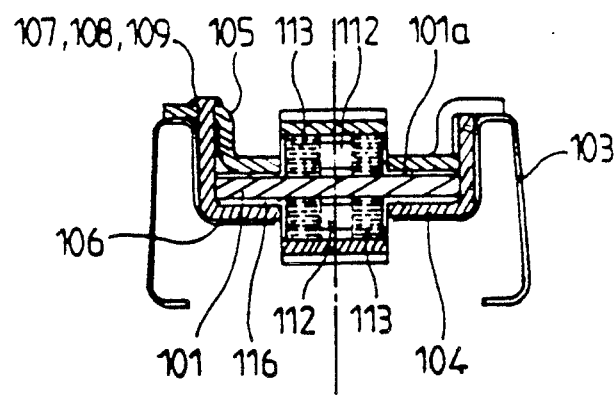
FIG. 21 is a cross-sectional view taken along line III—III of FIG. 20.

In FIG. 19, there has been shown in a schematic manner the armature 100 of the seat back of a seat, this armature being only shown by its lower end portion. The lower portion which is rigidly connected to the seating portion is a blade 101 which is plane and almost trapezoidal (see FIGS. 20 and 21) and formed, on its opposite faces 101a, 101b, with notchings 102.

Figure 20:
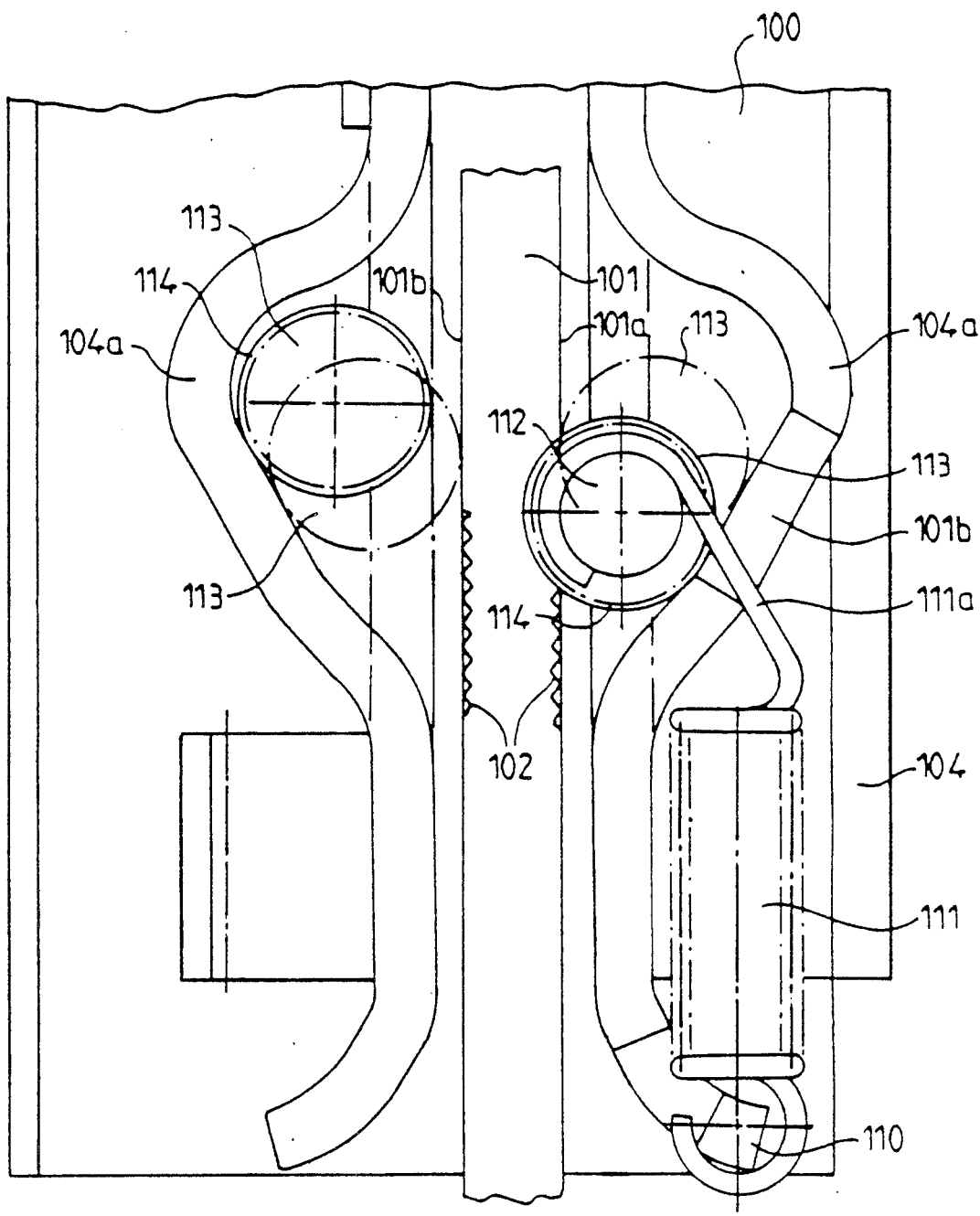
FIG. 20 is an enlarged cross-sectional view taken along line II—II of FIG. 19.

The armature 100 of the seat back carries a casing 104 of a substantially trapezoidal shape made of two parts 105, 106 connected as by welding and/or attached at points 107, 108, 109. The casing 104 has, as shown in FIG. 20, two bulging zones 104a, one at its upper portion and the other at its lower portion (see FIG. 19), these two bulging zones being in alignment one underneath the other. The edges of the casing 104 include steps 110 for providing fixation of spiral springs 111. A free end 111a of each spring 111 is attached to a central journal 112 of a serrated roller 113, the serrations 114 of which cooperate with serrations on notchings 102 of the armature 101 of the seating portion (see FIG. 20). The springs 111 which are traction springs have a tendency, due their position, to bias downwardly the rollers 113. It is pointed out that the ends 111a of the springs 111 extend through the bulging zone 104a of each casing 104 through openings 116.

It should also be noted in FIG. 20 that a single spring only is shown for the serrated roller 113, since the other serrated roller 113, which is on the left hand side of the drawing, is placed at the rear, and is therefore not visible.

Mounting of the assembly is effected in the following manner: when a casing 104 is in position on one of the sides of the seat back armature of a seat (see FIG. 19), and when the other side of the armature of this seat includes also the same casing 104 which is placed symmetrically, the only thing to do is to engage the triangular lower end of the seat back armature 100 so that the armature end 101 of the seating portion will come in abutment against the inner portion of the casing 104. The serrated rollers 113, by cooperating with the notchings 102 of the armature of seating portion 101, will then block the latter since the springs 111 have a tendency to bias downwardly the rollers 113, thereby blocking firmly the seat back armature on the seat base armature.

When a disassembly of the seat back is required, the only thing to do is to disengage the rollers 113 by bringing them back upwardly in the bulging zone 104a in order to free the notchings 102 from the serrations 114 of the rollers 113. The seat back is then free.

This construction enables an easy and reliable mounting of the seat back on the seat base, and this operation can be made on an automatic machine. Moreover, the simple but efficient design using the wedging by serrated roller provides for a blockage, without any play and of great safety, of the connection of the back portion with the seat, and this all the more as the bulging portions 104a are at a sufficient distance from one another.

What is claimed is:

1. A positioning and blockage device of a seat back armature on a seat base armature mounted in a vehicle in which rear ends of the seat base armature include fixation members, wherein each fixation member is mounted on an inclination setting mechanism for setting inclination of the seat back armature and is formed of a casing so shaped to receive a dagger fixed to each lower end of the seat back armature, said dagger being held within the casing by being wedged with assistance of a part made of a serrated roller mounted on a pin, whereby said roller can rotate freely inside openings formed in the casing and is pushed by at least one spring for wedging the roller between said dagger and said casing.

2. The device as set forth in claim 1, wherein said serrated roller mounted on a pin is formed by a central serrated roller with two lateral smooth extensions of smaller diameters.

3. The device as set forth in claim 1, wherein said dagger has a lower portion formed with an elongated opening adapted for introduction into the casing without interfering with a rotation shaft for said mechanism.

4. The device as set forth in claim 1, wherein the casing is mounted on the seat base armature on either side of the seat by means of rivets.

5. The device as set forth in claim 1, wherein the casing is mounted on the seat base armature on either side of the seat by means of welding.

6. The device as set forth in claim 1, wherein the casing is mounted on the seat base armature on either side of the seat by means of screws.

7. The device as set forth in claim 1, wherein said dagger is rigidly connected to a mobile portion of said mechanism and penetrates into the casing, said casing being formed by ends of the seat back armature and a lid fixed on an inner lateral side of the seat back armature.

8. The device as set forth in claim 1, wherein said dagger is blocked inside said casing via the serrated roller mounted on said pin, with said pin being pushed back downwardly by a spring and said pin bearing inside holes formed in the casing.

9. The device as set forth in claim 1, wherein said dagger is integrally connected to a mobile member of said mechanism.

10. A positioning and blockage device of a seat back armature on a seat base armature of a seat, in which the seat back armature has two ends each including a casing of substantially trapezoidal shape, wherein said casings include, at two superimposed and aligned positions, bulging portions adapted each for containing a serrated roller having a central journal for fixation of one end of a biasing spring, the casings having a lower portion provided with a step, an other end of said biasing spring being fixed to said step, said casings receiving, in an assembled state and by a vertical introduction, a lower end of the seat back armature made of blades of substantially trapezoidal shape and having opposite large faces provided with serrations cooperating with said rollers.

11. A device as set forth in claim 10, wherein the biasing springs are traction springs.

12. A device as set forth in claim 10, wherein each casing is made of two parts fixed to one another by any convenient means.

* * * * *